L. J. JACKSON.
DRAFT MECHANISM.
APPLICATION FILED DEC. 22, 1908.

955,805. Patented Apr. 19, 1910.

UNITED STATES PATENT OFFICE.

LAIRD J. JACKSON, OF PITTSBURG, PENNSYLVANIA, ASSIGNOR TO FRANK SEARIGHT, OF PITTSBURG, PENNSYLVANIA.

DRAFT MECHANISM.

955,805.  Specification of Letters Patent.  Patented Apr. 19, 1910.

Application filed December 22, 1908. Serial No. 468,700.

*To all whom it may concern:*

Be it known that I, LAIRD J. JACKSON, a resident of Pittsburg, in the county of Allegheny and State of Pennsylvania, have invented certain new and useful Improvements in Draft Mechanism, of which the following is a specification.

This invention relates to mechanism for evenly distributing the load or draft between the horses of a team, the arrangement being such that the draft forces are transmitted not only through the vehicle tongue or other central connection but also a direct pull is exerted on the load, as through the axle, at each side, the forces for each side being transmitted from both horses, thereby securing an even and most effective distribution of the load.

A further purpose is to provide for cushioning or compensating the strains when starting a load.

Still a further object is to provide for retracting the swingletrees when not under strain to keep them away from the legs of the horses when standing still or when going down grade, or whenever they are not pulling.

Still another purpose is to provide braces for engaging the road bed and so connected to the draft levers as to facilitate the load-starting operation.

Figure 1:
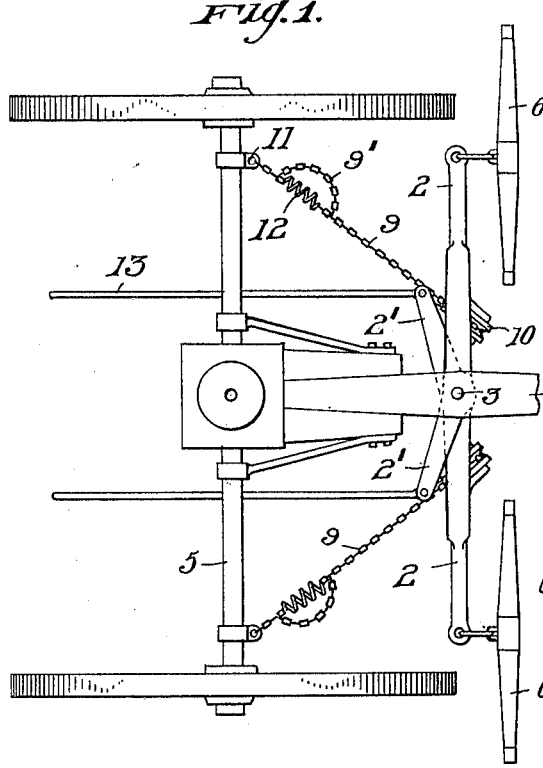
Figure 2:
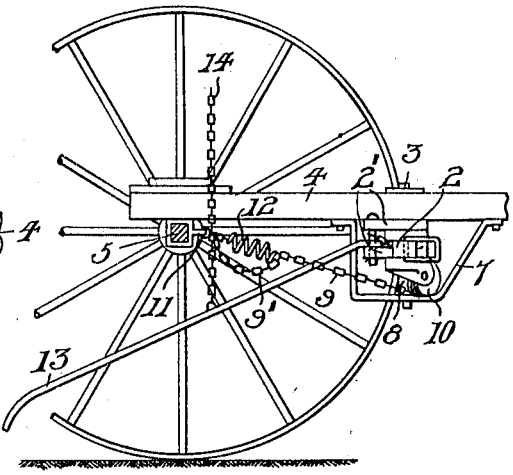
Figure 3:
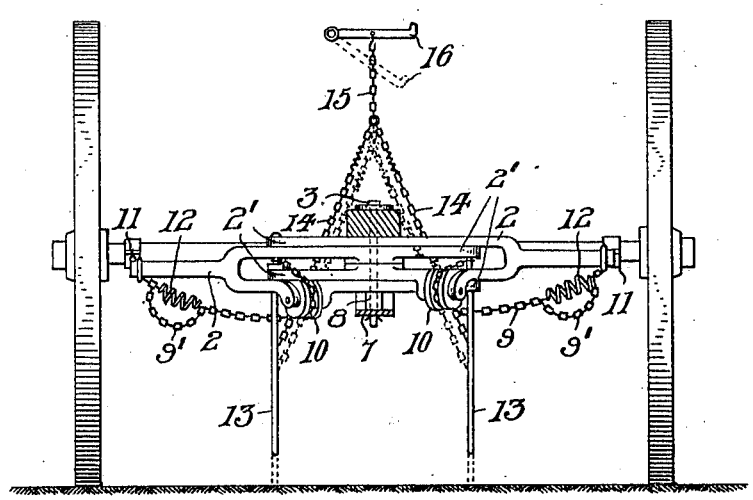

In the accompanying drawings, Figure 1 is a view in top plan of the mechanism applied to a wagon or like vehicle, the levers being shown in retracted position as when at rest or not under strain. Fig. 2 is a side elevation of the draft mechanism, and Fig. 3 is a front elevation.

Referring to the drawings, 2 designates the two overlapping levers which are substituted for the doubletree commonly used, the same being fulcrumed between their ends on bolt 3 to tongue 4 of the vehicle, of which 5 is the axle. Each of levers 2 is so arranged as to have a relatively long outer portion to which a swingletree 6 is secured, with a shorter inner portion 2′ beyond the fulcrum 3. The levers are preferably forked where they overlap, so that one may work within the other. The levers are held in position on the fulcrum bolt by clip 7 here shown secured to the under side of the tongue, and may be spaced upwardly by spool or washer 8, or they may be lowered with the spool arranged above if the mounting is such as thereby to place the draft mechanism more nearly in the plane of the axle. The short end 2′ of each lever has chain 9 secured at one end thereto, the chain passing forward through the forked portion of the other lever and downwardly around a pulley 10 secured to the latter, and from thence backwardly and outwardly where the opposite end of the chain is fastened to the axle at 11. A normally contracted spring 12 is arranged in the length of the chain, preferably adjacent the axle, so that when the horses are not pulling the draft mechanism will be retracted as in Fig. 1, forming slack 9′ in the chain beneath the spring. By this arrangement it will be seen that each horse instead of pulling directly against the other, as in the ordinary form of doubletree, exerts a pull at the center of the load through fulcrum 3 and also on opposite sides through chains 9, thereby more evenly distributing the load than heretofore. In addition to being of great advantage in pulling straight ahead, neither horse can be subjected to materially greater strain than the other when the wheels at either side encounter ruts or obstructions, as is the case when the ordinary doubletree is in use.

Brace arms 13 may extend outwardly and downwardly from the short ends 2′ of the levers to engage the road bed, so that when starting the strains are transmitted directly to these braces which afford such a purchase as to facilitate getting the load under way. These braces may be supported by cords or chains 14 leading to the single cord 15, connected to a latch 16 suitably mounted on the vehicle and by means of which the braces may be held from dragging and maintained in raised position whenever their use is not desired.

While I have here shown the invention applied to a wagon or like vehicle, it may be adapted for various uses and so connected as to be effective wherever a load is to be drawn by more than one horse.

I claim:—

1. In draft mechanism, two overlapping levers fulcrumed between their ends to provide each with inner and outer portions at opposite sides of the fulcrum with the outer portions adapted to receive swingletrees, and a chain secured at one end to the inner portion of each lever and passing around a pulley carried by the outer portion of the other lever with the opposite end of the chain fastened to the load.

2. In draft mechanism, two overlapping levers fulcrumed between their ends to provide each with inner and outer portions at opposite sides of the fulcrum, a chain secured at one end to the inner portion of each lever and passing around a pulley on the outer portion of the other lever and fastened to the load, and springs operating to slacken the chains and hold the levers normally drawn backward.

3. The combination of a vehicle tongue, two overlapping levers fulcrumed to the tongue with the outer portions adapted to receive swingletrees, pulleys secured to the outer portions of the levers, and chains secured at one end to the inner portions of the levers and passing around the pulleys and at their opposite ends secured to the vehicle.

4. In a draft mechanism, two overlapping levers forked to permit one lever to move within the other, a fulcrum common to the two levers with the levers arranged to provide relatively long and short portions at opposite sides of the fulcrum with the longer portions adapted to receive swingletrees, pulleys secured to the longer portions of the levers, and chains each secured at one end to the shorter portion of one lever and passing around the pulley carried by the other lever with the opposite end of the chain fastened to the load.

5. In draft mechanism, overlapping levers, a fulcrum common to the levers, each lever arranged to have relatively long and short portions at opposite sides of the fulcrum with the longer portions adapted to receive swingletrees, means connecting the shorter portions of the levers with the load, braces extending downwardly and backwardly from the shorter end of the levers and adapted to engage the road bed, and means for holding the braces elevated.

6. In draft mechanism, overlapping levers adapted at their outer ends to receive swingletrees, a fulcrum common to the levers and to which the levers are secured between their ends, means connecting the inner ends of the levers with the load, and braces extending backwardly and downwardly from the inner ends of the levers for engaging the road bed.

In testimony whereof I affix my signature in presence of two witnesses.

LAIRD J. JACKSON.

Witnesses:
ALEX. S. MABON,
J. P. APPLEMAN.